Sept. 2, 1969 A. G. SCHELLENBERG 3,465,299
INFORMATION TRANSLATING DATA COMPARING SYSTEMS
Filed Jan. 26, 1967 8 Sheets-Sheet 1
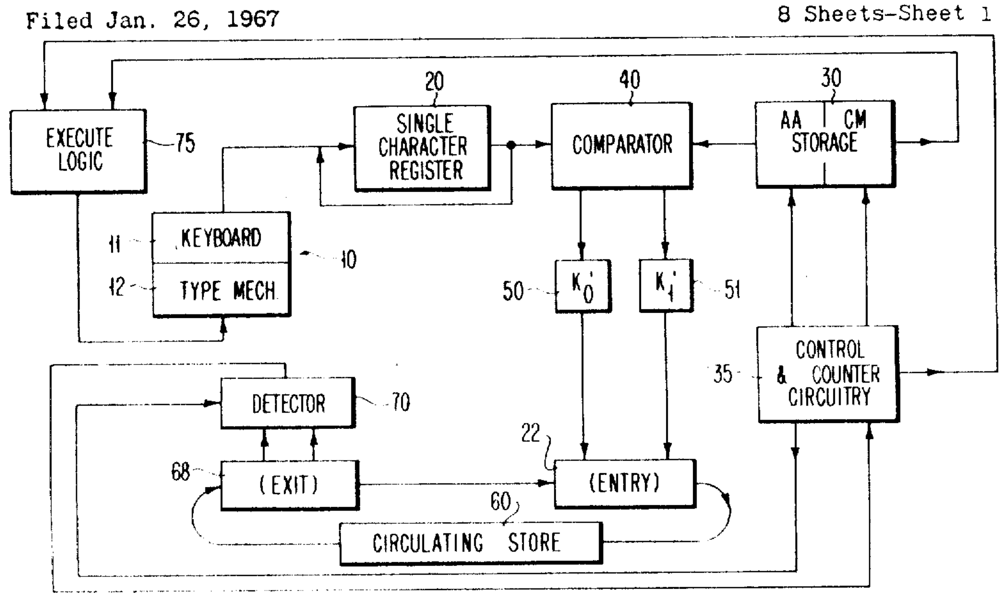
FIG. 1
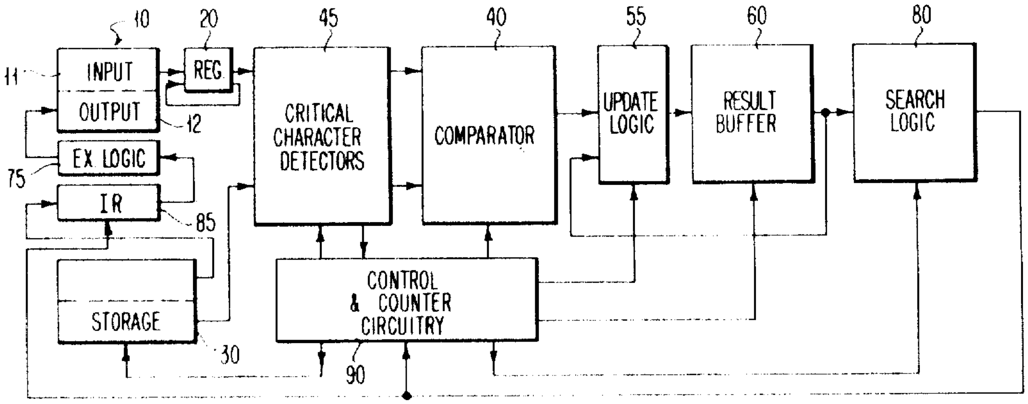
FIG. 2
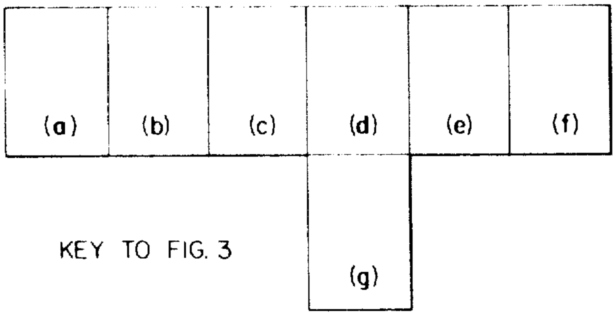
KEY TO FIG. 3
INVENTOR.
ANSELM G. SCHELLENBERG
BY George E. Roush
ATTORNEY Sept. 2, 1969 A. G. SCHELLENBERG 3,465,299

INFORMATION TRANSLATING DATA COMPARING SYSTEMS

Filed Jan. 26, 1967 8 Sheets-Sheet 3

Sept. 2, 1969 A. G. SCHELLENBERG 3,465,299

INFORMATION TRANSLATING DATA COMPARING SYSTEMS

Filed Jan. 26, 1967 8 Sheets-Sheet 4

Sept. 2, 1969 A. G. SCHELLENBERG 3,465,299

INFORMATION TRANSLATING DATA COMPARING SYSTEMS

Filed Jan. 26, 1967 8 Sheets-Sheet 5

United States Patent Office 3,465,299

Patented Sept. 2, 1969

3,465,299
INFORMATION TRANSLATING DATA COMPARING SYSTEMS

Anselm Gotthard Schellenberg, Los Gatos, Calif., assignor to International Business Machines Corporation, Armonk, N.Y., a corporation of New York Filed Jan. 26, 1967, Ser. No. 611,881
Int. Cl. G11b *13/00*
U.S. Cl. 340—172.5 24 Claims

ABSTRACT OF THE DISCLOSURE

Incoming digital data wording is compared in real time in one of a number of useful modes with a plurality of stored anticipated wordings associated with instructions or operations carried out on meeting comparison criteria. Results of successive comparisons are temporarily stored and a circulating store updated accordingly and thereafter sensed for the determination of the proper instructions or operations. Serial logical circuitry is exemplified.

The invention relates to digital data comparing systems, and it particularly pertains to information translating systems for use in machine learning and/or information retrieval. However, it is not necessarily limited to such systems but is applicable to digital data processing systems in which one or more of a number of anticipated wording(s), with or without variants, are compared with incoming data wording and a form of electronic or electromechanical control is exercised in accordance with the result.

In recent years the ratio of students to teachers has swollen to alarming proportions, as has the ratio between the amount of literature or other information available on almost any subject and the experienced searcher. In the field of education there has been an intensive investigation of the principles and practices of teaching and of the theory of learning with the aim of developing machines for assisting the teacher, with some thought even of virtually putting the student on his own in the simpler subjects. An extensive variety of devices have been proposed, ranging from the simplicity of electrographic-pencil marked sheets and electric scoring devices to a complexity involving digital computers in computer assisted instruction systems. In similar vein, there has been an intensive investigation of the storage and classification of information and the later retrieval of the stored information with the assistance of mechanical and/or electronic machines.

The educational machines devised thus far developed have been very promising but there has been a general weakness in that a student is not tested for his ability to generate a correct answer on his own but merely for his ability to recognize a correct answer. The storage of information is now readily accomplished by a large number of devices in a highly satisfactory manner. The retrieval problem, however, depends entirely too much on the human element in arranging a key or otherwise classifying the information and particularly in providing an accessible reference for the searcher. Conventional computer-based retrieval systems require lengthy and complex programs.

Examples of prior art arrangements are to be found in U.S. Patents: 2,868,447, January 1959, Wright et al.; 2,925,588, February 1960, Sublette et al.; 2,973,508, December 1961, Chadurjian; 3,068,450, December 1962, Fletcher et al.; 3,104,375, September 1963, Wright; 3,107,343, October 1963, Poole; 3,114,210, December 1963, Uttal; 3,121,959, February 1964, Uttal; 3,121,960, February 1964, Uttal et al.; 3,197,742, July 1965, Rettig et al.; 3,221,157, November 1965, Fleisher et al.; 3,235,845, February 1966, Falkoff; 3,248,704, April 1966, Roth et al.; 3,259,883, July 1966, Rabinow; et al.; 3,273,130, September 1966, Baskin et al.; and a foreign patent: France 1,415,547 September 1965.

According to the invention, the objects indirectly referred to hereinbefore and which will appear as the specification progresses are attained in a flexible, multimode, real time, serial data processing and information translating data comparing system. Data to be compared is entered one character at a time from an input device, such as a typewriter, and compared preferably binary hit succeeding binary bit, to a single character of a multi-character data source of information associated with the subject matter under consideration and particularly containing characters anticipated in the translating process. The current result of the comparison is stored in a temporary store. Only a single pair of temporary store latch circuits are required for a considerable number of modes of comparison as is disclosed herein in connection with an exemplary system. Manifestations of succeeding results are transferred to a result buffer circulating store. The contents of the store indicate, for instance, a complete match of bits or a mismatch of any one bit prior to the time the result is entered into the circulating store in accordance with the predetermined philosophy of the information translation in effect. A result detector is arranged to read the circulating store and search for the first indication of a satisfied compare, criterion between input wording and anticipated wording, or key wording or the like, to the control circuitry effective for thereafter controlling the information translating system in accordance with the predetermined arrangement thereof.

Weighting of anticipated wording readily may be provided in accordance with conventional computer-assisted-instructional techniques and timing may be incorporated for permitting escape where match is never completed or comes too slowly for the desired purpose.

In order that full advantage of the invention readily obtain in practice, preferred embodiments thereof are described hereinafter, by way of examples only, with reference to the accompanying drawing forming a part of the specification and in which:

FIG. 1 is a functional diagram of structural elements embodying the invention;

FIG. 2 is a block diagram outlining another embodiment of the invention given by way of example;

Figure 3A:
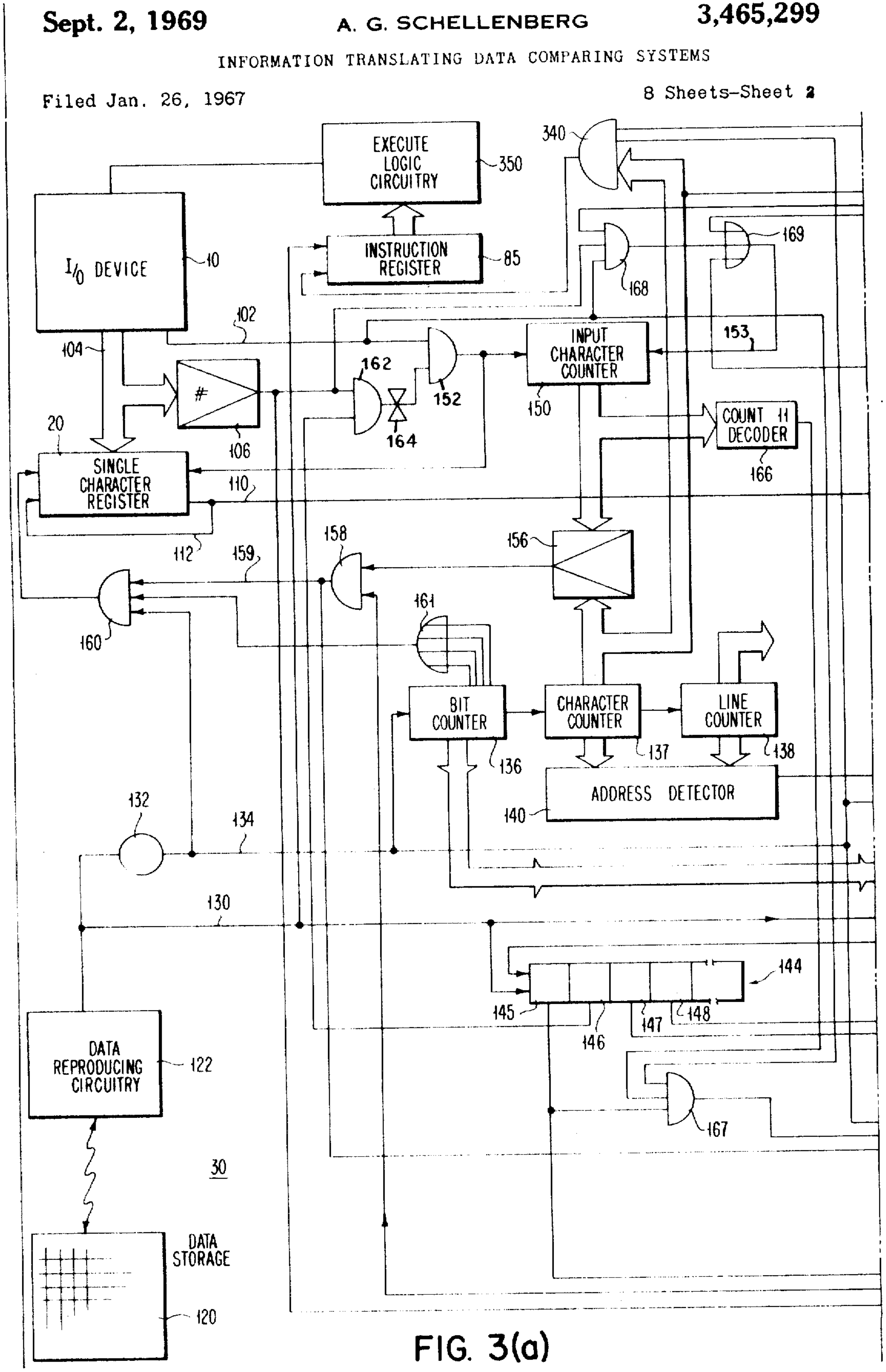
Figure 3B:
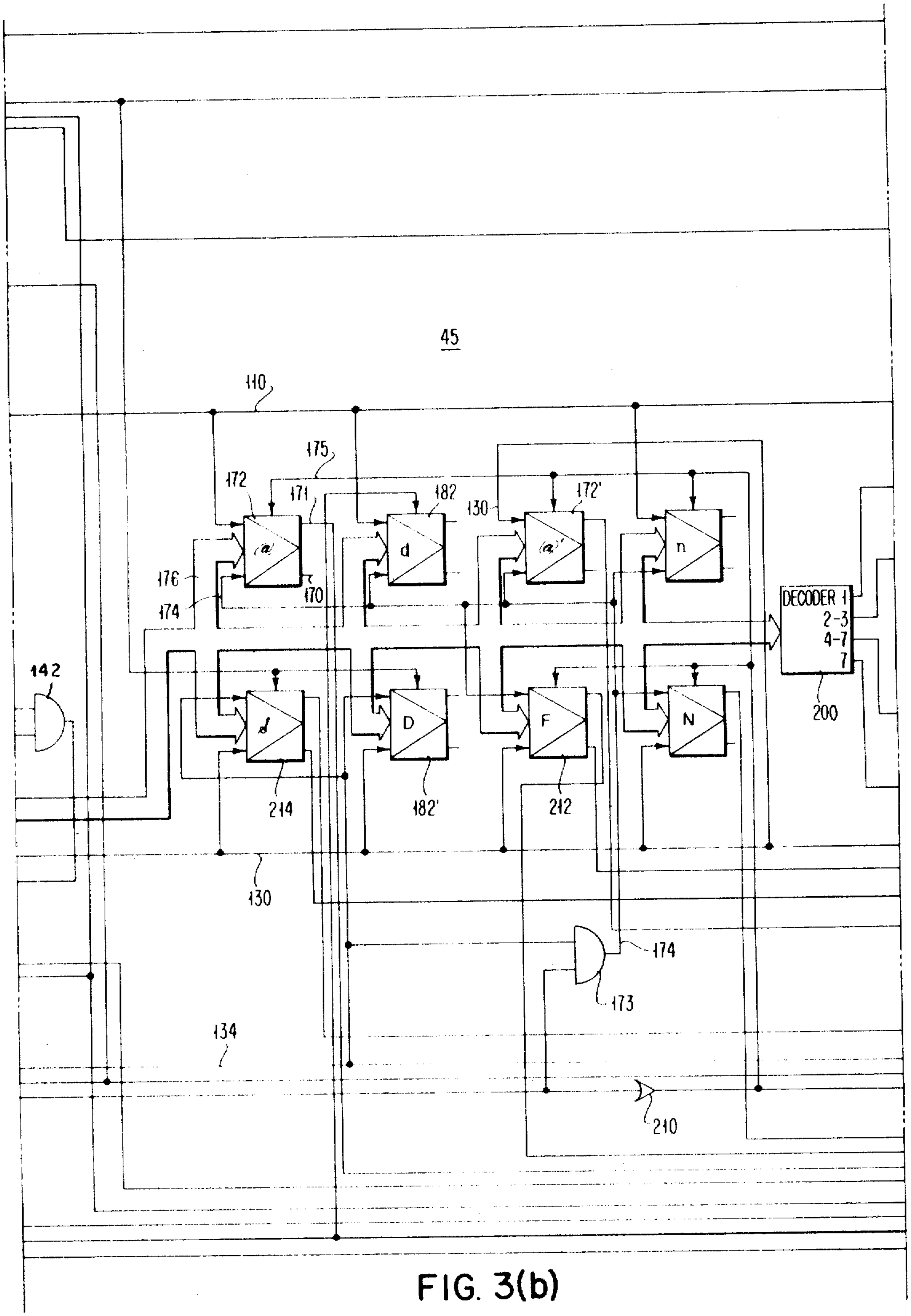
Figure 3C:
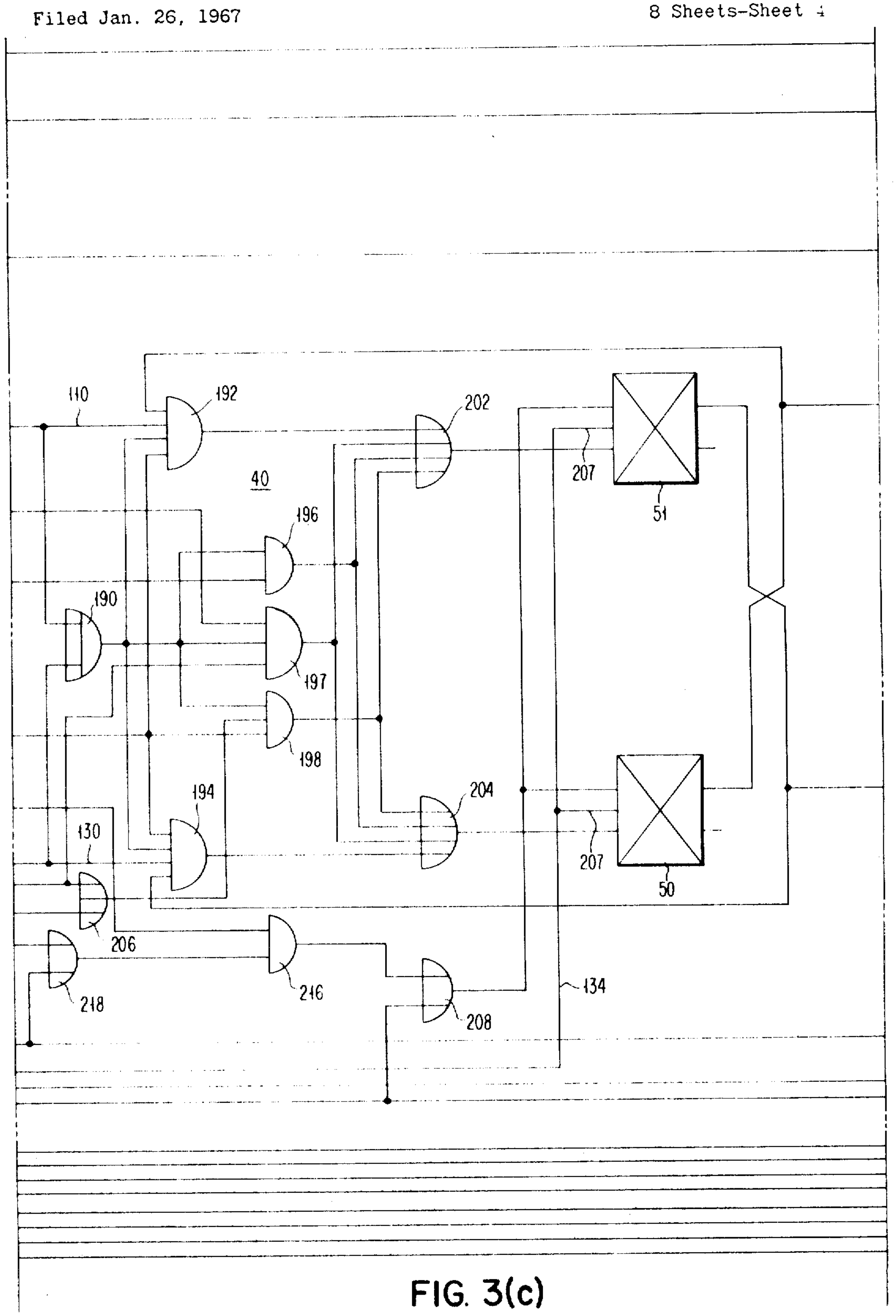
Figure 3D:
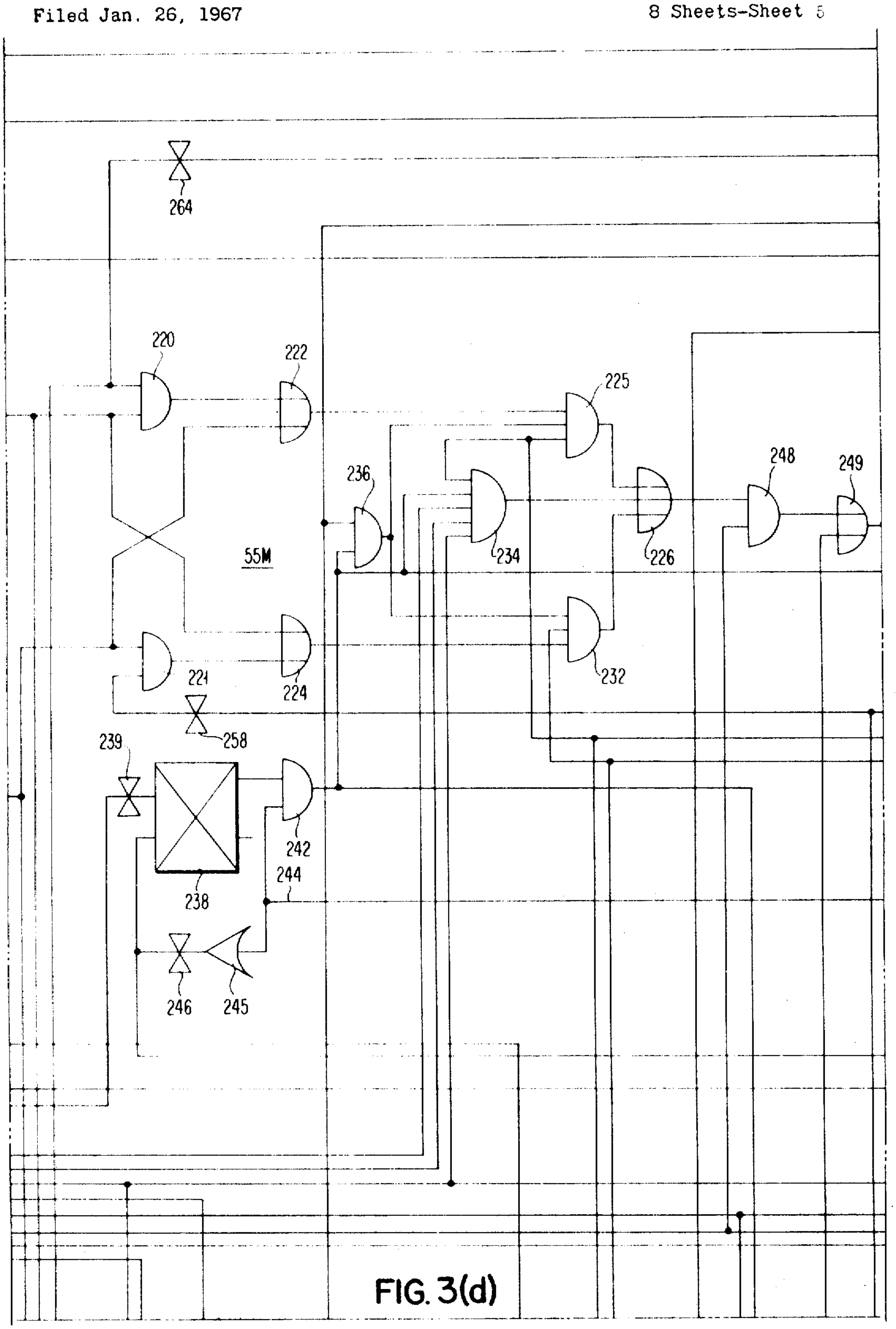
Figure 3E:
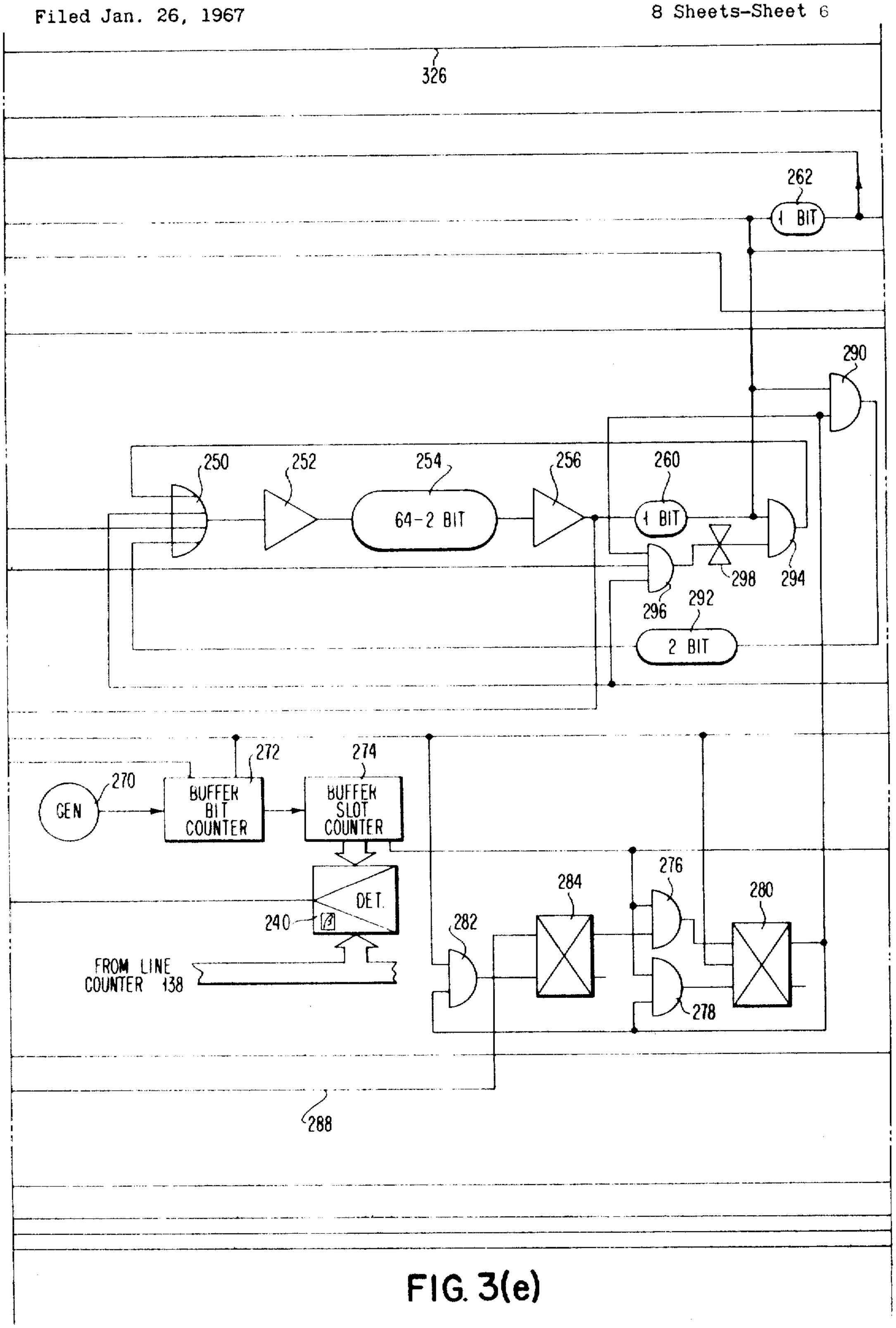
Figure 3F:
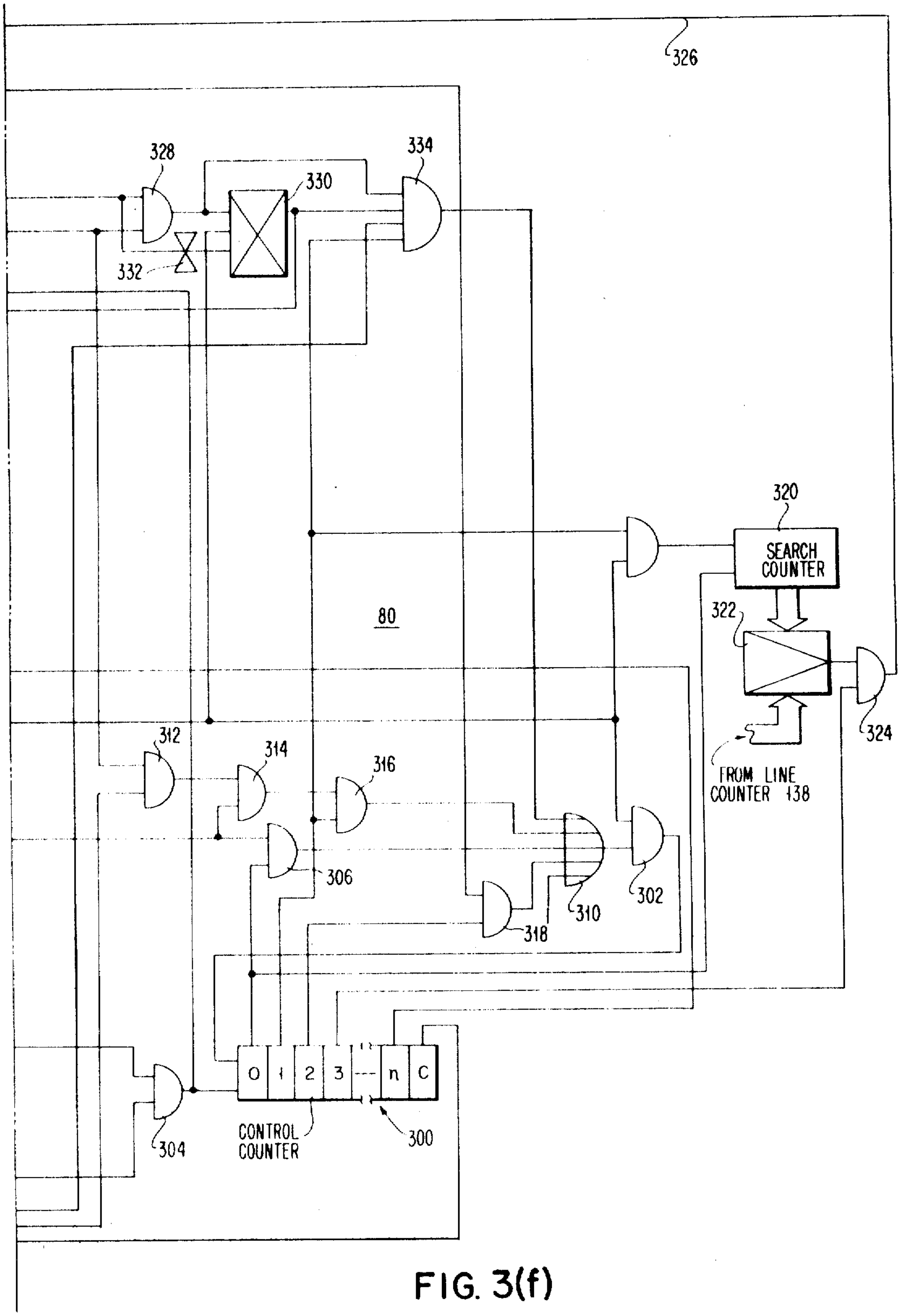
Figure 3G:
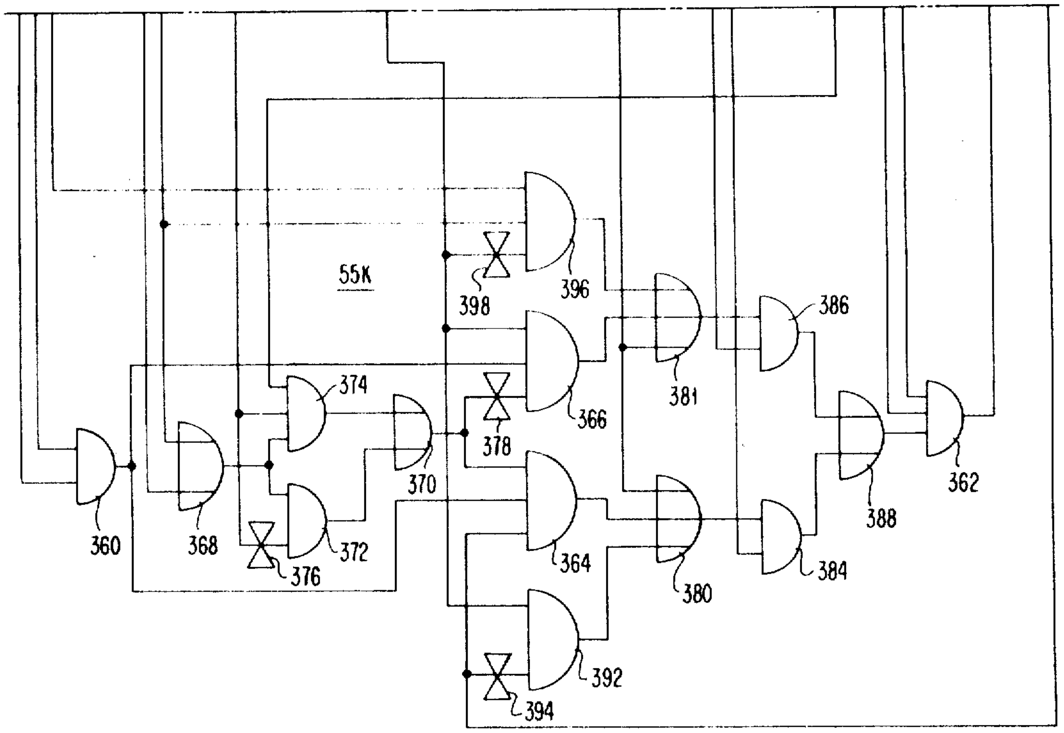
Figure 4:
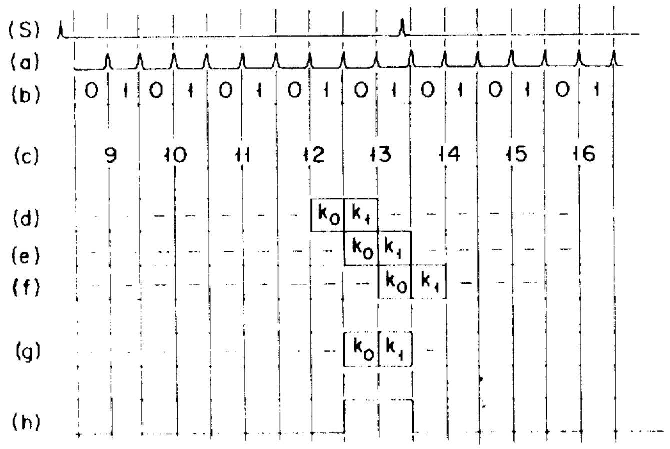

FIG. 3—Sections (*a*) through (*g*) being taken together—is a logical diagram of that embodiment of the invention outlined in FIG. 2; and FIG. 4 is a timing relationship diagram.

FUNCTIONAL ARRANGEMENTS

FIG. 1 sets forth the functions of basic components comprising a real-time, data-comparing system as useful in machine learning or in data retrieval. As a convenient example of an input-and-output (I/O) device effecting a complete system in which circuitry embodying the invention functions, there is shown a symbolic representation of a typewriter 10. This typewriter 10 has a keyboard 11 equipped with encoding means (not shown) for converting key strokes into binary digital coded electric signals completing the input device. The typewriter 10 also has a typing mechanism 12 equipped with decoding means for converting binary digital coded electric signals into typing mechanism displacement completing the output device. Such typewriters and encoding and decoding means are well known in the art. Data wording generated by depressing the keys of the typewriter keyboard 11 is entered one character at a time into a single character circulating buffer register 20.

A data storage 30 is arranged with data characters, comprising letters, numbers and/or other symbols, in binary digits effectively in matrix lines and columns. The storage 30 in and of itself is not a part of the invention and therefore is represented here only symbolically as a data storage of conventional form in all respects for reproducing binnary digital data in seriatim with the specific characteristic that the data is in effect stored in lines and columns and is scanned line after line with gating provided for reproducing digital data from the same ordinal single character in each row so that in effect a column by column scan is provided for the compare phase and those phases of operation where such scanning is necessary. It is suggested that advantage be taken of the high density packing capability of optical film and optical mechanisms of conventional components for producing a light beam and scanning the same over the storage for reproducing the data stored therein by conventional arrangements. The invention is not limited to use with such (Read Only) storage, but any other storage may readily be used. Short term volatile storage may even be used, for example in a computer assisted radar tracking system. The data recorded in the storage 30, is scanned line-after-line and gated in ordinal character order and applied serially by bit to a comparator 40 for comparison with succeeding ordinal bits of the single character stored in the circulating buffer store 20.

There is a definite advantage in the serial form of comparison. Perhaps the most important advantage lies in the freedom of the student or searcher to enter wording of unlimited length, whereas a parallel approach is adversely confining at the outset, especially in regard to cost. While the data storage 30 must have a finite capacity, this limitation is no greater than that found in the design of other machines. Although inherently slower in speed than a parallel approach, the speed of the serial circuitry described hereinafter is more than adequate for the purpose.

As each character of the stored data is compared with the character from the input device, the result is entered into a pair of latches 50 and 51 for temporary storage. These latches provide four indications of comparison and the compound result of the current comparison and the previous comparisons are stored serially in a larger circulating store 60 by way of entry means 62. The circulating store 60 is of such capacity that a complete set of current comparison results can be stored. As each incoming character is compared with the appropriate anticipated characters, the results stored in the circulating store 60 are updated. In this manner, the circulating store 60 will contain an indication of match, mismatch or two other desirable indications for each entire line of the data storage 30 at the end of the complete comparison. An exit circuit 68 is coupled to a detector circuit 70 for checking the updated results stored in the circulating store 60 for each line for a desired indication, as for instance, that of "match." When this desired indication is found, all or part of the associated wordage in the storage 30 is then delivered to an execute logic arrangement 75 which is interposed between the storage 30 and the typing mechanism 12 of the typewriter 10; or a data processing device.

Thus, for example, in an information retrieval system wording in the form of one or more descriptors is entered by means of the typewriter keyboard 11, as a result of the comparison, wordage associated with the descriptors, for example, a list of references would then be typed out from data in the storage 30 on the typing mechanism 12.

In a machine learning application, the data storage 30 in all probability would be initially set up to present a proposition to the student at the typewriter 10, for example, a short discussion of current lesson material. Thereafter a related question would be in order, in response to which the student would then type wording to be compared with anticipated answers in the storage 30. The results of the comparison would then effect the translation of associated wordage to the typing mechanism 12 or other output device. This associated wordage preferably would be in the form of critique outlining the correctness or incorrectness of the answer together with remedial reasoning if called for and the succeeding proposition in such form as the author of the course has prearranged.

Although the initial event differs for information retrieval and machine learning, the sequence of events of the information translating data comparing system according to the invention is substantially the same. It is considered usual in information retrieval for the searcher to initiate action by entering some identification which is associated with and a part of the information sought. This identification is compared with anticipated identification associated with the information and upon achieving a match at least a further part of the information is delivered by the system; in some instances the entire information is delivered. In machine learning it is considered usual for a proposition to be presented to the student for eliciting a response from that student to be compared with an anticipated response forming a part of the proposition as a latter term will be construed as used herein. For the purposes of this specification then, the term wordage is to be construed to include all of the data recorded in the storage including the anticipated wording associated with the wordage which includes all the letters numbers and/or symbols represented by the recorded data. By another, at least overlapping, definition, the term "wording" is construed as a subset of the term "wordage." This definition of terms is undertaken in order to better place the invention in its academic environment which has considerable bearing on the technical aspect which will be seen more clearly later in connection with the description of the various modes of comparison contemplated according to the invention. Subgenerically the terms information and identification as used hereinatfer are to be construed as limited to the information retrieval process unless otherwise noted. Information in the form of documents, abstracts, digests, references and files are called for by wording of that information identification in the form of identifiers, descriptors, citors, leads and labels, and other terms used in the retrieval of information by those skilled in the art. For machine learning purposes the subgeneric term proposition and associated response are used hereinafter. Questions and anticipated or associated answers, problems and solutions, stimuli and reactions, though the latter are less likely to lend themselves to the operation of the invention. Still they must not be excluded completely in view of the recording of data and rendering it in accordance with the principles of the invention. In machine learning, a proposition often takes the form of the commentary, including the treatise and the critique, to which there may not be a direct response. In the interest of efficiency, however, it is customary to conclude a proposition which is mostly commentary by asking an associated question or stating a problem to which the student is expected to generate an answer or a solution. The rejoinder and the retort are associated with the treatise and the critique but are less prone to the anticipation so that for the present machine learning may be expected to avoid the latter. The invention encompasses several modes of comparison, thus enabling the author of an instructional course or the searcher for information a wide latitude of approach in the solution of the respective problems as will be more fully set forth hereinafter.

MODES OF OPERATION

The system according to the invention is capable of multimode comparison of any alphameric character by which it is desired to convey intelligence. Two operational symbols are necessary for practicing the invention. Hereinafter the accountant's extension symbol, @, is considered not to be necessary for the intelligence under discussion to be conveyed by the system and is used as an operation symbol designating "ready" and/or designating "any character," even including the absence of a character, as will be more clearly set forth later. The concept of "any character" being acceptable is known; frequently such a character is referred to in the vernacular as a "don't care." The other operational character is the ampersand "&," which will be used to designate the separation between key word or key character sets, frequently referred to in the vernacular as a "set-separator." It should be understood that these symbols are used for convenience in this disclosure where a printable representation is desirable since they are available on the standard typewriter and linotype machines, however, in actual practice any, preferably nonprintable characters, will be substituted therefor.

The operational characters mentioned above are used in different manner with the different modes of operation according to the invention. For ready reference these modes are outlined below:

- M. Manifold
  - N. Normal
    - E. Exact
    - P. Partial
    - H. Hi/Lo
    - D. Disregard Shift
  - C. Compact
    - [E]. [Exact]
    - [P]. [Partial]
    - [H.] [Hi/Lo]
    - [D.] [Disregard Shift]
- K. Key
  - R. Random
  - S. Sequential These outlined modes will now be described and/or defined in the interest of more clearly setting forth the invention, however, it should be borne in mind that those skilled in the art will readily combine two or more of the above listed modes and also develop variants or even new modes without departing from the spirit and scope of the invention.

Basically, the contemplated modes of operation can be divided into two main types for convenience: Manifold or "M" mode; and Key or "K" mode. The term "Manifold" as used hereinafter is construed to include all modes of operation where substantially all of the incoming characters are compared in the system of the invention as against a comparison only of key characters or key words in the Key mode or K mode.

The Manifold or M mode may again be conveniently divided into two sub-modes: Normal or "N" mode; and Compact or C mode. The term "Normal" as used hereinafter is construed to include all modes wherein the input wording flows in normal manner, and is compared with the anticipated wording of the data storage frame character by character, as for example, a sentence is typed on the typewriter input keyboard, with initial capitals heading the first and such other words as the wording may call for with all spaces and punctuation just as though he were writing a letter. The term "Compact" as used hereinafter is construed to cover operation with the system according to the invention wherein the wording in the data storage frame is recorded without spaces or space characters in order to increase the density of information storable on a given frame. The input wording, insofar as the person typing is concerned, is the same for the Normal or N mode; the difference in the mode lies in the arrangement of the circuitry according to the invention whereby the incoming space characters are detected and ignored (or neglected in a sense of the word) insofar as the comparison is concerned. A moments reflection will indicate that a tremendous advantage in the packing density of information is afforded by merely omitting space characters thereby eliminating the need for anticipating large numbers of space character combinations.

Operating in either of the two modes, at least four more divisions can be made. The first divisional mode, immediately suggested, is a mode wherein each and every one of the characters of the input wording (except possibly the spaces) is compared with the stored anticipated wording and wherein, unless there is an "exact match," the comparison is considered a "mismatch." This mode is termed the E (and [E] where the spaces are suppressed) mode for convenience. A variant of this mode is the partial or "P" mode wherein the importance of one or more characters of a larger group of characters is sufficiently low as to be immaterial. For such situations the previously mentioned "Any Character," @, is used to pad out insignificant portions of the anticipated wording thereby indicating that the corresponding part of the input message is neglected. The abbreviations P and [P] are used to represent this partial submode in either the Normal or compact mode. Thus, as previously stated, submodes according to the invention may comprise a plurality of other modes.

In both the normal and compact modes, input wording characters can be compared in two other modes hereinafter referred to as the "Hi/Lo" or H mode and the "disregard shift" or D mode. The description will now proceed to a description of a system for use in accordance with the aforementioned modes.

EXEMPLARY SYSTEM

FIG. 2 is a block diagram of an exemplary embodiment of the invention for performing the functions as described hereinbefore with the addition of means for performing other functions expanding the application of the principles of the invention. Again for the purpose of completing a system with the minimum amount of mechanism for the purposes of explanation, a typewriter 10 is shown symbolically as having an input translator 11 and an output translator 12. A single character circulating register 20 accepts the data for comparison with characters from the data storage 30. A number of specific or critical character detectors 45 are provided for establishing the presence of a character having critical significance in an operation. For example space characters are generated by the keyboard 11 of the typewriter 10 in response to pressure on the space bar. It is possible to suppress certain characters, if desired. Frequently it will be found advantageous to suppress space characters for all comparisons associated with a given problem. This is particularly helpful in reducing the number of permutations of anticipated wording where the number(s) of space characters only differ. Such space suppression is readily accomplished provided the data storage 30 contains the appropriate command code and the anticipated wording does not contain any space characters. Hence, a space character detector is provided for operation in such a mode. Likewise the decimal point, end of message, any characters, and the like, are of critical significance. The output of the register 20 and the data storage 30 are applied to a comparator 40 and the results stored in the result buffer 60. Updating logic 55 is provided for properly posting the results in the result buffer 60 in accordance with the mode of operation, as will later be more fully described. Logically circuitry 80 operating in response to the result buffer 60 is arranged to enable the foregoing circuitry at the proper time by supplying gating waves to an instruction register 85 coupled between the data storage 30 and the execute logic arrangement 75 leading to the output decoding element 12 of the typewriter 10 or to other data processing arrangements, and to the control and counter circuitry 90.

Simplified logical circuitry for an embodiment of the invention conforming generally to the latter diagram is shown in FIG. 3. This exemplary embodiment employs a minimum of serial result buffering and logical circuitry affording low cost and high reliability at a high speed of operation. The depression of a key of the typewriter 10 in FIG. 3(*a*) serves to generate a binary coded electric signal having a strobe bit on the line 102, a shift bit and several, more frequently six, data bits, transmitted in parallel over a path 104 loading the single character register 20 and a space character detector 106 in parallel. The character in the register 20 is shifted out bit by bit on line 110 and recirculated on line 112. In this manner the character is presented over and over again to the comparator as will be described.

The data storage 30 is represented here as a data storage frame 120 and frame scanning and data reproducing circuitry 122. These elements are available in conventional form in all respects for reproducing binary digital data in seriatim. Those skilled in the art can readily combine known arrangements to meet the specific characteristic that the data is effectively stored in lines and columns, is scanned line after line and is gated digitally from the same ordinal single character in each row to effect a column by column scan for the compare phase and those phases of operation where such is desired. It is contemplated that an embodiment of the invention will utilize the high density packing capability of optical film whereby the storage frame 120 may be a single film chip or one frame of a multiple of similar frames of motion picture type film and the like. In such case the frame scanning and data reproducing circuitry 122 will comprise conventional optical components for producing a light beam and scanning the same over the storage frame 120 and thereafter reproducing the data stored therein by further conventional arrangements.

The first line of the frame as shown in Table I following contains an optional frame address (ADDR) forming no part of the invention in and of itself and three special purpose instructions: the "initializer" (INIT) which contains data used to set up the operating mode(s) that remain effective for the entire period during which the storage frame is being scanned; the "first execute" instruction (FIRS) which is executed immediately after the frame is accessed; and the "no match" (NOMA) instruction which is executed in the event the response does not match one of the programmed anticipated wordings.

Beginning with the second line are a number of lines of anticipated wording. Each of these lines contains up to 12 data characters followed by one instruction. An anticipated wording of more than twelve characters may be continued on the following lines. In all cases it is the instruction on the last line of an anticipated answer which is executed in the event that the anticipated answer matches the response. In the event that several anticipated wordings match the response, the instruction associated with the matching anticipated wording nearest the top of the program frame is chosen. Alternately, weighting factors may be used to govern this choice. Space not used for anticipated wording and the associated instructions can be used to store additional (chain) instructions and messages for transmission to the output printer. The smallest usable storage space increment is the 4-character field. The end of the anticipated wording is denoted by a special operational character which is represented by "@."

In the storage frame in Table I individual bits are not shown but the alphameric characters represented thereby are shown instead. It is to be understood, however, that in scanning, for example on line three, and for the first input character, the reproducing circuit is gated so that only the binary digits or bits of the initial letter "G" are reproduced in synchronism with the corresponding bits of the character circulating in the store 20 for comparison in the comparator 40. While the comparison is actually made on a bit-by-bit basis, as described, the data compare system according to the invention frequently may be discussed as a character-for-character comparison for ease in understanding.

The output data from the data reproducing circuitry 122, FIG. 3(*a*), is applied to an anticipated wording line 130 leading to the comparator 40. A clock pulse generating circuit 132 is arranged to generate clock pulses in

TABLE I

| L\C | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | A | D | D | R | I | N | I | T | F | I | R | S | N | O | M | A |
| 1 | G | R | E | Y | | G | H | O | S | T | @ | | I | N | S | T |
| 2 | G | R | A | Y | | G | H | O | S | T | @ | | I | N | S | T |
| 3 | G | R | @ | Y | | G | H | O | S | T | @ | | I | N | S | T |
| 4 | G | R | E | E | N | | E | Y | E | D | | G | I | N | S | T |
| 5 | H | O | S | T | @ | | | | | | | | I | N | S | T |
| 6 | G | R | E | E | N | | G | O | U | R | D | @ | I | N | S | T |
| 7 | & | | | | I | N | S | T | I | N | S | T. | I | N | S | T |
| 8 | Y | O | U | | A | R | E | | C | O | R | R | E | C | T | @ |
| 9 | Y | O | U | | M | I | S | S | E | D | | T | H | I | S | |
| 10 | O | N | E | | | T | R | Y | | A | G | A | I | N | @ | @ |
| 11 | R | E | R | E | A | D | | T | H | E | | T | E | X | T | |
| 12 | T | O | | F | O | L | L | O | W | | @ | | I | N | S | T |
| 13 | I | N | S | T | I | N | S | T | I | N | S | T | I | N | S | T |

response to the data flow on the anticipated wording line 130. Circuitry for generating clock pulses from digital data are well known and no further description is deemed necessary. For cathode ray tube type optical scanning arrangements, a clock rate of 100 kh. is common, while mechanical type optical scanning are capable of 10 kh. operation and multiple-core storage is capable of rates up to several mh., but are bulky and more expensive at present.

Clock pulses are applied on a line 134 to a series of frame address counters comprising a bit counter 136 of three stages, a character counter 137 of 4 stages and a line counter 138 of 6 stages. The latter two counters are coupled to an address detector 140, the output of which is ANDed with clock pulses in a gate 142 for application to an initializer register 144 to which frame data pulses on line 130 are also applied.

The initializer register 144 is loaded from data in the first line of each frame in shift register fashion. The content of this register 144 establishes the circuit arrangement for the mode by which the system is to operate for a given frame. As shown, the first stage 145 is set for the M mode previously mentioned. The second stage 146 is set for the C modes. The third stage 147 controls operations for the K modes and the fourth stage 148 further specifies the R or S mode.

An input character counter 150 is incremented by the single character data wording register load pulse at the output AND circuit 152 and reset by the occurrence of the 12th character count pulse on line 153 when in the M Modes or upon the occurrence of a space character in the key word modes. The contents of the character counter 150 and the frame address character counter 137 are compared for coincidence in a coincidence detector 156. The output of this detector is delivered to a compare enable AND gate 158 together with an input indicating the system to be in the compare phase. The output line 159 of the enable gate 158 is connected to a shift AND gate 160 for shifting the single character input wording register 20. Clock pulses from the clock pulse regenerator 132 and the output of an OR circuit 161 complete the input to the shift gate 160. An AND gate 162 having inputs from the space character detector 106 and the second initializer stage 146 for the compact mode of operation followed by an inverter 164 closes the AND gate 152 to space characters. A count 11 (12th character) decoding circuit 166 is coupled to an AND gate 167 to which strobe pulses from line 102 and the level set by the first initializer stage 145 in the M, modes are also applied. The output of this AND gate is passed through the OR circuit 169 to reset the input character counter 150.

The data wording line 110 and the anticipated wording line 130 are connected to the comparator 40 and to a number of "critical character" detectors as required, examples of which are shown in FIG. 3(*b*). For example, the READY signal, @, previously mentioned, is necessary at the end of the input operation. As shown a pair of terminals 170 and 171 indicate the absence or presence respectively of an input ready character. Clock pulses as determined in an AND gate 173 are applied on line 174. The compare enable line is up for the duration of a single character compare operation. An A.C. reset is available on a line 175 bearing the compare enable signal. The appropriate bit lines of the bit counter 136 are applied in parallel over the line group 176 to the critical character detectors. The lines in the group are ANDed and INVerted as required for detecting the character in known manner and the output of the critical character detector essentially comprises circuitry of latch-like characteristic. The critical character detectors in and of themselves are not a part of the invention. From this brief description of the requirements for these detectors those skilled in the art will readily assemble known circuit components in known manner for the particular situation at hand. Another READY ("Any") character detector 172' is shown having the set input terminal connected to the anticipated wording line 130 for purposes that will appear later. Likewise, decimal point detectors 182 and 182' differing only in the input connections to lines 110 and 130 respectively and in their mode of clocking are shown for operations wherein the decimal point is critical. Critical character detectors for other purposes are similarly constructed, and of course those skilled in the art will be able to employ other configurations as well depending on their circumstances.

An example of a comparator 40 is shown in FIG. 3(*c*). The data to be compared on wording lines 110 and 130 are applied to an Exclusive OR (XOR) gate 190 and to a pair of AND gates 192 and 194. The output line of the XOR gate 190 is connected to the AND gates 192 and 194 and to three further AND gates 196, 197 and 198. A decoder 200 is arranged in known configuration, for example, ANDing and INVerting circuitry, for outputs on bits 1, 2–3, 4–7 and 7 for application to the AND gates 196, 197, 198 and 216 as shown. An OR circuit 206 applies inverted output from the Flag and Set separator detectors 212, 214 to the AND gate 198. The outputs of the AND circuits 192, 194, 196, 197 and 198 are applied to a pair of OR gates 202 and 204 for resetting temporary result storing latches 50 and 51 at the clock time with which clock pulses are delivered to gating terminals 207. The temporary result latches 50 and 51 are set through the intermediary of an OR circuit 208 at either one of the following times: the beginning of a compare enable, as determined by a differentiating circuit 210, or the end of a compare sequence if either the Set separator detector 214 or the "any" character detector 172' are down by way of an AND gate 216 and an OR gate 218.

The current comparison results stored in the temporary result latches 50 and 51 are entered into the circulating store 60 through the intermediary of the updating logic circuitry 55M or 55K. For the moment the updating logic circuitry 55E for the manifold modes only will be considered as shown in FIG. 3(*d*). Like terminals of the latches 50 and 51 are connected to input AND gates 220 and 221 and input OR gates 222 and 224 as shown. This information is gated out of the updating circuit by way of an OR gate 226 through the intermediary of an AND gate 248 and an OR gate 249. Updating is controlled by the output of an update latch 238 which is set by way of an inverter 239. The output terminals of the latch 238 and the detector 240 are coupled to an AND gate 242. The latter AND gate 242 is operative only while the latch 238 is on and the coincidence level on line 244 is up, indicating that the compare indicator pair associated with the anticipated wording line for which a character comparison had just been executed is being read out of the result buffer and is ready to be updated. A differentiating circuit 245 and an inverter 246 are coupled to the coincidence line 244 to reset the update latch 238. Alternately, an A.C. type latch may be used whereby the differentiator and inverter are unnecessary.

The output of the OR gate 226 is coupled by an AND gate 248 and an OR gate 249 to a result buffer input OR gate 250 shown in FIG. 3(*e*). The output of the OR gate 250 is applied to a recording amplifier 252 for entering binary data into a delay line 254 of sufficient capacity to store a two-bit binary indicator for each of the lines of a data store frame 120. The delay line 254 is preferably a magnetostrictive type delay line in the interest of efficiency and low cost. Those skilled in the art may refer to U.S. Patent 3,177,450 to N. S. Tzannes for Delay Line Transducers, to U.S. Patent 3,273,131 to W. G. Strohm and E. F. Yhap Queue Reducing Memory for Information on Practical Delay Lines and to U.S. Patent 3,289,171 to A. L. Scherr and C. J. Tunis for Push-Down List Storage Using Delay Line. A driving amplifier 252 and a reproducing amplifier 256 of types of conventional for use with delay lines are suggested. The output of the latter amplifier 256 is applied through an inverter 258 to the AND gate 221, previously described, and to a one-bit delay 260. The output of the delay 260 is applied to another one bit delay 262, the output of which is fed by way of an inverter 264 to the other update input AND gate 220.

A buffer timing wave generator 270 of conventional circuitry, operating at about one megahertz, for example, provides the necessary timing for recirculation of the buffer. The operation of the buffer is asynchronous with that of the data store. The buffer store need only be operated sufficiently faster than the line scan of storage frame 120 to enable accessing and updating while the remaining portion of the current line and the beginning of the next line is being read. A buffer bit counter 272 and a buffer slot counter 274 are connected in tandem to the buffer clock generator 270. These counters constitute the buffer address counters. The buffer bit counter 272 is a single binary stage and the buffer slot counter 274 has a capacity of 64 in the example given. The pulses stored are applied in strict order in accordance with each line of storage frame 120. One pair of pulses represents the result for each line of the frame. Each two pulse time positions are termed a "slot" for convenience in the understanding. The output of the slot counter 274 is applied to the coincidence detector 240 for comparison with an output from the address line counter 138. Coincidence of these two counters brings up the coincident line 244 as described hereinbefore, indicating that the compare indicator slot assigned to the line of the storage frame 120 currently being scanned is read out of the delay line 254. The final count level (63) of the buffer slot counter 274 is coupled to precess AND gates 276 and 278 the output lines of which are coupled to the set and reset inputs respectively of a precess latch 280. The naught (0) count of the buffer bit latch 272 is applied to the update AND gate 232. While the unit (1) output is applied to the update AND gate 228 and to the precess AND gate 282 for resetting a latch 284. The precess latch 280 is set and reset at buffer bit count one time. The latch 284 is set over line 288—from the AND gate 167 in FIG. 3(*a*)—for the manifold compare phases at input character counter reset time. The output of the precess latch 280 is coupled to the precess input AND gate 282 for resetting the latch 284 at buffer unit (1) count time.

The output of the precess latch 280 and the output of the one bit delay line 260 are ANDed in a gate circuit 290 to couple the output of the amplifier 256 to the buffer input OR circuit 250 after a delay of three bits through the one bit delay device 260 and an additional two-bit delay device 292. The output of the amplifier 256 after a delay of one bit by the delay device 260 is also applied to the buffer input OR circuit 250 by means of an AND gate 294 to which the inverse output of an AND gate 296 is applied by means of an inverter 298.

FIG. 4 illustrates timing relationships for the result buffer. Curve (S) is an example of the line scan clock derived from the data storage frame 120 where the pulse repetition rate is slower and the pulses are asynchronous with respect to the buffer clock train in curve (*a*). Curves (*b*) and (*c*) are examples of bit count and slot count representations, respectively. The data in lines (*d*) (read early, (*e*), and (*f*) (read late) show the results of the delay elements 260 and 262 on the readout of the result buffer store with respect to the write signal into the buffer on line (*g*). The update enable signal (line 244) is shown as line (*h*).

Search logic is shown in FIG. 3(*f*). A phase control counter 300 is incremented by means of an increment pulse gated through an AND gate 302 and reset by way of an AND gate 304 at the end of the compare phase when the ready signal has been set into the ready latch 172 and the last update cycle has been completed. Count zero of the phase control counter is applied to circuitry for awaiting the result buffer to reach the home position. Phase zero of the control counter 300 is ANDed with buffer slot count 63 in an AND gate 306. The output of AND gate 306 is applied through an OR gate 310 to the AND gate 302. The output of the one bit delay device 260 is applied to AND gate 312 the output of which is applied to an OR gate 314 along with the buffer slot count 63. This OR gate 314 is applied to an AND gate 316 along with phase one of the phase control counter 300 and the result is applied to the OR gate 310. Frame character naught(0) count in the address character counter 137 is applied to another AND gate 318 with phase two of the control counter 300. The output of AND gate 318 is also applied to the OR gate 310. The output of OR gate 310 is ANDed with buffer bit unit (1) count in the AND gate 302 for application ultimately incrementing the phase control counter 300. The counts in the search counter 320 and in the line counter 138 are applied to a coincidence detector 322. The output of the detector 322 and phase three of the control counter 300 are applied to an AND gate 324 producing an output signal on line 326 for ultimate application to the instruction register 85 as will be shown later.

An AND gate 328 is arranged to set a key word control latch 330 in response to coincidence of pulses from the output of the one-bit delay device 260 and the one-bit delay device 262. The key word latch 330 is reset from a pulse from the one bit delay device 262 by way of an inverter circuit 332. The output of the key word control latch 330 is applied to an AND gate 334 coupled through the OR gate 310 to the AND gate 302 to increment the phase control counter 300. Phase *n* is applied to the AND gate 296 and to the input OR gate 250 of the result buffer.

The output line 326 from the AND gate 324 is connected to an AND gate 340 shown in FIG. 3(*a*). Outputs from stages representing characters 12 through 15 from the address character counter 137 are applied to the AND gate 340 along with clock pulses for producing a shift pulse for the instruction register 85. The latter commands execute logic circuitry 350 coupled to an I/O device, here the typewriter 10.

The key word modes require a somewhat different logic circuitry for updating the result buffer. FIG. 3(*g*) contains an example of such keyword updating logic. The output lines of the temporary result latches 50 and 51—FIG. 3(*c*)—are applied to an input AND gate 360. The updating level from an output AND gate 362 is applied to the OR gate 249—FIG. 3(*d*)—under the timing control of the update latch 238 and the update AND gate 242.

In the keyword modes the first stage 145 of the initializer register 144 will be down closing the AND gate 248 to all other modes and effectively disabling the update logic circuit 55E. The third stage 147 will be up enabling the keyword output gate 362 effectively interposing keyword updating logic circuit 55K into the system.

The output of the AND gate 360 is applied to further AND gates 364 and 366. Space character or ready character signals are applied through OR gates 368 and 370 to the AND gates 364 and 366. AND gates 372 and 374 are interposed between these OR gates 368 and 370. While the fourth stage 148 of the initializer register 144 is down an inverter 376 will bring the AND gate 372 up so that the random keyword (R) mode is enabled. The other AND gate 374 is up while the fourth stage 148 is up thereby enabling the sequential keyword (S) mode. The latter AND gate 374 is effective only while the keyword latch 330 is up. The output of OR gate 370 is fed into AND gate 364 and by way of the inverter 378 into the AND gate 366. Outputs from the amplifier 256 and the 1-bit delay device 260, respectively, enable AND gates 364 and 366 the outputs of which are applied through OR gates 380 and 381 to AND gates 384 and 386.

The latter are enabled at $k_0$ and $k_1$ bit times from the bit counter 272 to pass the outputs through an OR gate 388 to the output AND gate 362.

The output of the 1-bit delay device 260 is applied to an AND gate 392 for updating while the output of the reproducing amplifier 256 is down through the intermediary of an inverter 394. Another AND gate 396 and associated inverter 398 pass space character signal to the OR gate 381 should it occur while the input and output of the 1-bit delay device 262 are both down.

A brief description of the operation will be of value. Incoming characters from the typewriter 10 are counted in the counter 150 and are temporarily stored in the input register 20. When operating in the Compact Mode, space characters do not contribute to the character count. It is possible to suppress space characters for all comparisons associated with a given frame data storage 120 if the initializer so specifies. The anticipated wording in such a frame does not contain any space characters.

A character is held in the input register 20 for the duration of at least one complete frame scan. Whenever the serial frame reader 122 reaches a character position which coincides with the relative number of the input character, the two characters are serially compared. Then, while the remaining portion of the current line and the beginning of the next line of the frame is read, the result-indicator pair which correspond to the line just examined is accessed from the recirculating result buffer 254 and updated according to the rules discussed below.

The 8-bit characters in an anticipated wording are arranged as follows: 6 bits are data bits which are compared with the corresponding bits received from the input register; one bit is a shift indication bit which may or may not be compared with the corresponding bit from the input register; finally there is the flag bit F which is used to denote the type of comparison (equal, high-low, shift neglect) to be made. The characters in an input message are similarly arranged except that the flag bit is not applicable.

In the manifold mode, characters can be compared in several ways. The manner of comparison of a given pair of characters is determined by information contained in the character being read from the data storage frame 120.

The E or P modes apply to both numeric and alphabetic characters. For numeric characters, the flag bit "F" preceding the other bits in the characters as stored in the data storage 30 must be "zero" for E or P comparison to take place. For alphabetic characters, where the comparison indication is unnecessary, the "naughts" (0) flag bit indicates that the shift indication bits, as well as the data bits, must be compared; a "units" (1) flag bit indicates that the shift indication bits are to be ignored. If the shift indication is ignored, it is possible to achieve a "match" with an anticipated wording regardless of whether the input wording is entered in upper or lower case.

Whenever insignificant input wording characters can be ignored, the corresponding positions in the anticipated wording will contain characters identical to the end-of-response character (represented by @), but referred to as "any" characters when they appear in the data storage frame 120. Characters from the input register 20 coinciding with these "any" characters are ignored; that is, they cannot change the current compare result contained in the result buffer 60. The end-of-response character @ from the input buffer, however, must line up with one of the @ characters in the anticipated wording; otherwise, the result indicators will be set to indicate a mismatch. A sequence of any characters, @, in the anticipated wording may be followed by significnat characters provided the exact length of the sequence can be anticipated.

The mechanics of setting the result indicators for the E and P modes comparison are shown in Table II following. At the start of a comparison phase the result indications in the result buffer 60 are set to 11:. [Those numerals expressing plural digit quantities in the binary base hereinafter will be followed by a pair of dots, as 10:, for example.] For a match to be achieved, the indicators must be in the 11: stage after the end-of-response character from the input register 10 has been compared. An example of the results of the comparison of several anticipated answers with an input message is shown in Table III following.

At the beginning of the Execute phase, that is, after detection of an end of response character, @, the position of the matching line is determined by counting the $K_1=0$ bits and stopping the count after sensing the first $K_1=1$. If an input wording matches several prerecorded anticipated wordings, only the first match is considered.

The first instruction executed is the one associated with the match line, if no match was detected, the machine branches to the "no match" instruction.

An anticipated answer exceeding 12 characters, is simply continued on the next line(s) in chaining fashion.

If the operator has not entered an end of response character, @, by the time the character count has reached 12, the character counter 150 is reset and all compare indicators in the result buffer 60 are delayed or "processed" two bit times. A compare bit pair previously assigned to line $n$ will now be lined up with line $n+1$.

After this shifting operation the compare sequence is continued normally. Theoretically, up to the maximum number of lines on a frame can be chained together.

The Hi/Lo comparison applies to numeric characters only. Digits 0–9 and the decimal point are the only characters considered numeric. A Hi/Lo comparison is indicated by a "unit" in the flag bit of the character read from the data storage frame. When operating in this mode, an anticipated wording is selected if it is numerically greater than or equal to the input wording; that is. if the result indicators in the buffer slots are 01: or 11: at the end of a compare phase of the cycle.

TABLE II

EXACT MODE COMPARISONS

| Previous state of Result Indicators (for line L) $K_0K_1$ | Result of Comparison | Next State of Result Indicators (for line L) $K_0K_1$ |
|---|---|---|
| 11: | = | 11: |
| 11: | ≠ | 00: |
| 11: | @ (any) | 11: |
| 00: | = | 00: |
| 00: | ≠ | 00: |
| 00: | @ (any) | 00: |

TABLE III

Use of "Any" character Comparisons in Handling Various Forms of the Same Wording in [D] mode:

| Anticipated wording: | | | | | | | | | | | | | |
|---|---|---|---|---|---|---|---|---|---|---|---|---|---|
| | a) | 8 | s | @ | @ | @ | @ | @ | @ | @ | @ | @ | @ |
| | b) | 9 | s | @ | @ | @ | @ | @ | @ | @ | @ | @ | @ |
| | c) | 1 | 0 | s | @ | @ | @ | @ | @ | @ | @ | @ | @ |
| | d) | @ | @ | @ | @ | @ | @ | @ | @ | @ | @ | @ | @ |

Some input wording which will match b) and d) above are:

```
9 S E C O N D S @
9   S E C O N D S @
9 s e c s @
9   S E C @
9 s @
9     s @
```

The mechanics of setting the result indicators for the hi/lo comparison are shown in Table IV following. At the start of a compare phase they are set to 11: and are subsequently changed according to the result of the character comparisons. Once the result indicators in the buffer slots are 01: or 10: they can only be changed when a decimal point occurring in the input message does not coincide with a decimal point from the program frame or vice versa. If the decimal point occurs first in the anticipated answer, the result indicators are set to 10:; if it occurs in the input message, they are set to 01:. The result indicators, in the result buffer 60 are changed only on the first encounter of a non-coinciding decimal point.

If an alphabetic character from the input register coincides with a numeric character indicating hi/lo comparison from the data storage frame a mismatch occurs and the result indicators are switched to the 00: state for the rest of the comparison phase.

"Any" characters in Hi/Lo sequences function in much the same manner as for other compare modes, that is, a comparison involving them does not change the setting of the result indicators. However, if an end-of-response, @, character from the input register 20 is compared with a numeric character indicating hi/lo comparison from the anticipated wording, a mismatch condition does not result. In such a case one of the following procedures takes place:

TABLE IV

| Previous State of Result Indicators | Result of Comparison | Next State of Result Indicators |
|---|---|---|
| $K_0K_1$ | | $K_0K_1$ |
| 01: (Greater) | >, =, <, @ | 01: |
| 11: (Equal) | > | 01: |
| | = | 11: |
| | < | 10: |
| | @ | 11: |
| 10: (Less) | >, =, <, @ | 10: |
| 00: (Mismatch) | >, =, <, @ | 00: |
| 00:, 01:, 10:, 11: | MISMATCH | 00: |

(a) If a decimal point has been previously received by the comparator from either the input register or the data store or both, the compare phase is terminated and further action depends on the current setting of the result indicators.

(b) If no decimal point has been received and the result indicators are not in the 00 state, they are unconditionally set to 01: thus causing the selection of the instruction associated with that anticipated wording.

These procedures are included to remove constraints on the form of the input response wording. The only remaining constraint is that the response wording contain no leading zeros. The anticipated wording, however, should always contain a decimal point, containing no leading zeros, and be "padded out" (to the maximum length of the operator's response) with "any," @, characters.

Within a given anticipated wording a sequence of characters to be compared in the hi/lo mode may be preceded and/or followed by a sequence of characters to be compared in the exact or partial modes. In this case, a match occurs if and only if the sequence (or sequences) to be compared on the E or P modes are identical to the coinciding portions of the input wording and the sequence to be compared in the hi/lo mode is greater than or equal to the coinciding portion of the input wording.

During such mixed E or P and H mode comparisons the result indicators are set according to the rules in Table IV, with the mismatch condition extended to include "not equal" results on comparisons where the equal basis is indicated. An example of the H mode comparison and at mixed E or P and H mode comparisons are shown in Table V and VI following.

In Table V the input wording is 543.07@ and the eight lines of anticipated wording are chosen to illustrate the settings of the appropriate result indicators. Column A represents the initial setting of the indicators while Column H represents the final. Line 5, Column H indicates the anticipated wording selected by the given input response.

Certain applications may call for long multiword input responses. Such responses are difficult to anticipate in details and require a great deal of data storage space. However, it will in many cases be possible to describe the essential information content with a limited set of keywords or key characters.

In such a Keyword or K mode one or more sets of recorded anticipated key wordings are compared with the input wording. The instruction associated with a set is selected if all keywords listed in that set are contained in the input wording. If several anticipated sets are contained in an input message, the instruction associated with the first matching set will be selected.

One of two versions of the keyword mode is selected on the basis of information in the initializer. In the Sequential version a set is selected if and only if the keywords contained in the input message are received in the same order in which they are listed in the keyword set. In the Random version the order in which the keywords are received is immaterial. The sequential, or S, mode is a very useful concept in both machine teaching and information retrieving which is readily available according to the invention. For example, it is of great importance to be able to distinguish between "oxygen . . . free" and "free . . . oxygen," and between "Pope Alexander" a clergyman, and "Alexander Pope" a poet.

An example for a mixed comparison is given in Table VI where the input wording is —74 SEC@. Line 11 contains the anticipated answer selected by the given input response wording.

The arrangement of the storage frame for the Key modes is somewhat different from that for the Manifold compare modes. Instead oif containing an anticipated wording and its associated wordage, a storage frame line contains a complete keyword followed by at least one space or "any" character. Space characters serve as end-of-word indicators. Sets of keywords are separated from each other by a line which contains, in the first character position, a set separator character (&), and in the last four character positions, the instruction to be executed if the preceding set matches. An example of a storage frame to be used in the keyword mode is shown in Table VII following.

The manner in which the input wording is entered when it is to be compared in the key modes is the same as for the manifold modes. Since space characters serve to separate words in the wording, the space-suppression feature is not available in the key modes and neither in the Hi/Lo compare feature.

TABLE V

For Input Wording: 453.07@

| Line | ANTICIPATED WORDING | Column A | B | C | D | E | F | G | H |
|---|---|---|---|---|---|---|---|---|---|
| 1 | . @ @ @ @ @ @ @ @ @ @ @ | 11: | 10: | 10: | 10: | 10: | 10: | 10: | 10: |
| 2 | 7 . 6 @ @ @ @ @ @ @ @ @ | 11: | 01: | 10: | 10: | 10: | 10: | 10: | 10: |
| 3 | 9 9 . 9 @ @ @ @ @ @ @ @ | 11: | 01: | 01: | 10: | 10: | 10: | 10: | 10: |
| 4 | 4 5 3 . 0 5 @ @ @ @ @ @ | 11: | 11: | 11: | 11: | 11: | 11: | 10: | 10: |
| 5 | 4 5 3 . 0 7 6 @ @ @ @ @ | 11: | 11: | 11: | 11: | 11: | 11: | 11: | 11: |
| 6 | 4 5 3 . 3 9 @ @ @ @ @ @ | 11: | 11: | 11: | 11: | 11: | 01: | 01: | 01: |
| 7 | 1 0 0 0 0 . @ @ @ @ @ @ | 11: | 10: | 10: | 10: | 10: | 10: | 01: | 01: |
| 8 | @ @ @ @ @ @ @ @ @ @ @ @ | 11: | 11: | 11: | 11: | 11: | 11: | 11: | 11: |

Column A is the Initial setting (I) 4 5 3 . 0 7 @

TABLE VI

For Input Wording: -74 Sec@

| Line | ANTIC. WORD. | Column A B C D E F G H |
|---|---|---|
| 9 | -10SEC@ | 11:11:10:10:10:10:10:10: |
| 10 | -25SEC@ | 11:11:10:10:10:10:10:10: |
| 11 | -75SEC@ | 11:11:11:01:01:01:01:01: |
| 12 | -@@SEC@ | 11:11:11:11:11:11:11:11: |
| 13 | +@@@@@@ | 11:00:00:00:00:00:00:00: |
| 14 | @@SEC@@ | 11:11:11:00:00:00:00:00: |
| 15 | @@@SEC@ | 11:11:11:11:11:11:11:11: |
| 16 | @@@@@@ | 11:11:11:11:11:11:11:11: |

Insofar as a given keyword in the storage frame is concerned, comparison is carried out in the same manner as in the exact version of the manifold mode except that this phase is terminated when an end-of-response character or the sixteenth character in a word is received from the input register. "Ignore shift" flaps and "any" characters may be used in the same manner as in the exact and partial—or padded—versions of the manifold modes.

TABLE VII

| | | |
|---|---|---|
| KW Set 1 | ADDRINITFIRSNOMA | |
| | Beethoven | |
| | Symphon@@@ | |
| | Concerto@ | |
| | & | INST. |
| KW Set 2 | Rossini | |
| | Italian | |
| | OPERAS | |
| | Cooking | |
| | & | INST. |
| KW Set 3 | Wagner | |
| | Opera@@@ | |
| | NOISY | |
| | Teutonic | |
| | && | INST. |
| Chain | INSTINSTINSTINST. | |
| Inst | INSTINSTINSTINST. | |

In the Random Mode the indicator pairs associated with data tracks are handled as shown below. At the end of an instruction execution all result indicators are set. Indicator pairs associated with set separator lines (see Table VII) are left in the set state.

| $K_0K_1$ | |
|---|---|
| 1 1 | Set separator indication |
| 0 1 | Character match |
| 1 0 | Word match |
| 0 0 | Mismatch |

For example: Indicator pair ($K_0K_1$) is assumed to be associated with keyword TREE in the Column I below:

| $K_0K_1$ | I | |
|---|---|---|
| 1 1 | | Initial State |
| 0 1 | T | Character match |
| 0 0 | H | Character mismatch |
| 0 0 | E | Character mismatch |
| 0 1 | | Word did not match set $K_1$ (try next word) |
| 0 1 | T | Character match |
| 0 1 | R | Character match |
| 0 1 | E | Character match |
| 0 1 | E | Character match |
| 1.0 | | Word did match, set $K_0$ and reset $K_1$ (neglect future words) |
| 1 0 | I | |
| 1 0 | S | |
| 1 0 | | |
| . . | | |
| . . | | |
| 1 0 | @ | (End of input) |

Each incoming word is compared with all keywords. If a result indicator pair is in the no match state 00: at the time a space character is received (end-of-word), it is put back into the character match state 01: and compared against the next incoming word. If on the other hand, the pair is still in the character match state at the time the space character is detected, it is switched to the permanent word match state 10: in which it remains until the end of the answer is reached.

TABLE VIII

| | | | |
|---|---|---|---|
| 0 | ADDR INIT FIRS NOMA | | |
| 1 | F | | |
| 2 | R | | |
| 3 | K | Set A "Frankfurt" | |
| 4 | F | | |
| 5 | T | | |
| 6 | & | | INST.A |
| 7 | D | | |
| 8 | M | | |
| 9 | S | Set B "Darmstadt" | |
| 10 | T | | |
| 11 | & | | INST.B |
| 12 | H | | |
| 13 | D | | |
| 14 | B | Set C "Heidelberg" | |
| 15 | G | | |
| 16 | & | | INST.C |

To get ready for a new word compare sequence, the character counter 150 is reset each time a space character is detected.

At the end of the compare sequence, the compare bits may be in a state as shown below. The line number of the proper instruction is found by counting result indicator pairs until reaching the end of the first completely matching word set.

| | | $K_0$ | $K_1$ | Counter | |
|---|---|---|---|---|---|
| | & | 1 | 1 | 0 | start |
| | | 1 | 0 | 1 | |
| Set 1 | | 1 | 0 | 2 | |
| | | 0 | 1 | 3 | |
| | | 1 | 0 | 4 | |
| | & | 1 | 1 | 5 | |
| Set 2 | | 1 | 0 | 6 | |
| | | 0 | 1 | 7 | |
| | & | 1 | 1 | 8 | |
| | | 1 | 0 | 9 | |
| | | 1 | 0 | 10 | |
| matching | | 1 | 0 | 11 | |
| | | 1 | 0 | 12 | |
| | & | 1 | 1 | 13 | (Stop, read and execute |
| | | 1 | 0 | 14 | the "set-3 instruction" |
| | | • | | • | recorded on line 13.) |
| | | • | | • | |
| | | • | | • | |
| | | • | | • | |

The procedure for the sequential mode is very similar to the one outlined above except that a result indicator pair may only be set to the word match state if the preceding pair is already in the word match (or set separator) state, that is, if the preceding $K_0$ bit is on.

A keycharacter compare mode is suggested as being useful. In this mode characters are treated as one-character keywords. This allows input wording to be tested for the presence of anticipated character combinations, making it possible to recognize, for example, misspelled words without having to anticipate a large number of misspellings. An example of a possible frame layout is shown in Table VIII following. Lines 1–5 form the key character set for the word "Frankft" and line 6 contains the instruction therefor if the input wording compares favorably, and so on.

If several groups of Keycharacters (words) must be included in an answer set, the above method can easily be expanded such that all 16 columns of a storage frame become available for keycharacter storage. Several possible arrangements will be suggested to those skilled in the art.

By introducing a column result buffer in addition to the line result buffer, it is possible to operate with keywords, where each "word" is represented by a set of keycharacters.

A simple logical extension of the keyword mode is the LIST MODE. In its simplest form it allows a "list" of up to 31 keywords to be compared with the incoming wording and further action to be taken depending on the NUMBER of keywords contained in the message. The primary instructions associated with the up to 31 numbers are located in the fourth field of lines, 32 through 63.

While the invention has been shown and described particularly with reference to preferred embodiments thereof, and various alternates have been suggested, it should clearly be understood that those skilled in the art may effect still further changes without departing from the spirit and the scope of the invention.

I claim:

1. An information translating data comparing system comprising:

a single-character register in which data to be compared is entered character-by-character, a comparator having one input connected to said register, another input and an output, a multi-character data source connected to said other input of said comparator and arranged to enter data character-after-character into said comparator, a temporary result store coupled to said output of said comparator and having an output terminal, a circulating store coupled to said output terminal, of said temporary result store for storing all of the results of all comparisons, and circuitry coupled to said circulating store and to said temporary store for maintaining a predetermined condition of each of said results of said comparisons once that condition exists, regardless of any other results of subsequent comparisons.

2. An information translating data comparing system as defined in claim 1 and wherein:

said register comprises a circulating register.

3. An information translating data comparing system as defined in claim 2 and wherein:

said comparator comprises a single-bit comparator, and said data source is arranged to enter data bit-by-bit into said comparator.

4. An information translating data comparing system as defined in claim 1 and wherein:

said circulating store comprises a delay line.

5. An information translating data comparing system as defined in claim 4 and wherein:

said delay line comprises a magnetostrictive device.

6. An information translating data comprising system as defined in claim 1 and wherein:

said temporary result store comprises an electronic latch arrangement.

7. An information translating data comparing system as defined in claim 1 and wherein:

said source comprises a storage matrix arranged in rows and columns, control circuitry scanning row-by-row, and gating circuitry interposed in said control circuitry for effecting column-by-column scanning.

8. An information translating system with data comprising, comprising:

a storage having means for storing a multiple of data comprising associated wordage and anticipated wording, an output device for presenting wordage located in said storage, an input device for generating given wording, a register coupled to said input device for receiving at least a portion of said given wording, a comparator coupled to said register and to said storage for comparing the portion of the given wording generated and at least a portion of said anticipated wording, control circuitry for synchronizing and controlling the system, a temporary store coupled to said comparator, a circulating store coupled to said temporary store for storing the results of all of the successive comparisons, circuitry coupled to said stores for maintaining a predetermined result in said circulating store thereafter for each result of a comparison of the successive characters of said given wording and the corresponding characters of all of said anticipated wording once that predetermined result obtains, a result detector coupled to said circulating store and responsive to the first result of a match of said given and anticipated wording for determining wordage located in said storage associated with said given wording, and circuitry responsive to said result detector for transmitting said wordage associated with said given wording to said output device.

9. An information translating system with data comparing as defined in claim 8 and wherein:

said input and said output devices comprise a typewriter and translating circuitry for converting key strokes into digital impulses and conversely.

10. An information translating system with data comparing as defined in claim 8 and wherein:
said detector comprises
means manifesting at least one predetermined result, and
comparator circuitry for indicating a comparison between said predetermined result and the results circulating in said store.

11. An information translating system with data comparing as defined in claim 8 and incorporating:
a counter in said control circuitry for addressing said storage and said circulating store.

12. An information translating system with data comparing, comprising:
a storage having means for storing a multiple of data comprising associated wordage and anticipated wording,
data transducing means for reproducing said data from said storage,
an input device for generating given wording,
a character register coupled to said input device for receiving at least a portion of said given wording,
a comparator coupled to said register and to said storage data reproducing means for comparing that portion of said given wording generated and at least a corresponding portion of all of said anticipated wording,
control circuitry including clock pulse regenerating means coupled to said data reproducing means for synchronizing and controlling the system,
a temporary store coupled to said comparator,
a circulating store coupled to said temporary store and arranged for storing all of the results of all of the successive comparisons,
a circulating store clock pulse generator for cycling said circulating store,
circuitry coupled to said stores for maintaining a predetermined result of each of said results of all of said comparisons in said circulating store thereafter once that result appears at said circulating store,
a result detector coupled to said circulating store and responsive to the first matching comparison result ultimately stored therein for determining wordage located in said storage associated with said given wording,
an output device for presenting wordage located in said storage, and
circuitry for transmitting the last said wordage to said output device.

13. An information translating system with data comparing as defined in claim 12 and incorporating:
an initializing mode register coupled to said storage, and
mode logical circuitry enabled by said mode register interposed between said comparator and said temporary store for storing of results successive comparisons only in accordance with a predetermined mode of comparison.

14. An information translating system with data comparing as defined in claim 12 and wherein:
said mode logical circuitry comprises:
one portion arranged for operation in one predetermined mode,
another portion arranged for operation in another predetermined mode, and
gating circuitry coupled to said mode register and to said circuitry portion for establishing the mode of operation in accordance with the contents of said mode register.

15. An information translating system with data comparing as defined in claim 12 and incorporating:
a critical character detector circuit coupled to said input device,
a critical character detector circuit coupled to said data storage, and
means coupled to said critical character detector circuits for comparing the outputs thereof and coupled to said temporary store for establishing the condition thereof in predetermined manner with respect to that particular critical character.

16. An information translating system with data comparing as defined in claim 12 and incorporating:
a storage address counter coupled to said data storage,
an input character counter coupled to said input device, and
a coincidence detector coupled to said counters and to said comparator for enabling the latter upon determining coincidence between the contents of said character counter and the contents of the corresponding portion of said storage address counter.

17. An information translating system with data comparing as defined in claim 16 and wherein:
said control circuitry comprises a control counter, and
a coincidence detector is coupled to said control counter and said storage address counter for enabling the transfer of results in said temporary store to said circulating store.

18. An information translating system with data comparing as defined in claim 16 and incorporating:
an instruction register coupled to said data storage and to said output device,
search logical circuitry coupled to said circulating store and to said instruction register,
a search counter interposed in said search logical circuitry, and
a coincidence detector coupled to said storage address counter and said search counter for enabling said instruction register in accordance with a predetermined mode of operation.

19. An information translating system with data comparing as defined in claim 13 and wherein:
said data storage is arranged without space characters,
said input device is a keyboard and encoding device having a space character generating element,
a space character detector is coupled between said input device and said comparator for ignoring space characters in the operation of said system in a space suppressed mode.

20. An information translating system with data comparing, comprising:
an input/output device,
a single character recirculating register coupled to the input portion of said device,
a data storage having scanning means,
a comparator coupled to said register and to said storage,
updating logical circuitry coupled to said comparator,
a result buffer coupled to said comparator and to said updating logical circuitry,
search logical circuitry coupled to said result buffer,
an instruction register,
instruction execute logical circuitry coupled to said instruction register and to the output portion of said input/output device, and
control circuitry including synchronizing circuitry for controlling said system for asynchronous operation, comparison and searching and synchronous updating.

21. An information retrieval system with data comparing, comprising:
a storage having means for storing a multiple of information data comprising associated reference data and anticipated descriptors,
data transducing means for reproducing said data from said storage,
an input device for generating descriptors,
a character register coupled to said input device for receiving at least a character of each generated descriptor,
a comparator coupled to said register and to said storage data reproducing means for comparing that character of the descriptor generated and the corresponding character of all of said anticipated descriptors, control circuitry including clock pulse regenerating means coupled to said data reproducing means for synchronizing and controlling the system, a temporary store coupled to said comparator, a circulating store coupled to said temporary store and arranged for storing all of the results of all of the successive comparisons, a circulating store clock pulse generator for cycling said circulating store, circuitry coupled to said stores for maintaining a predetermined result of each of said results of all of said comparisons in said circulating store thereafter once that result appears at said circulating store, a result detector coupled to said circulating store and responsive to the first matching comparison result ultimately stored therein for determining information located in said storage associated with said given descriptor, an output device for presenting information located in said storage, and circuitry for transmitting the last said information to said output device.

22. A machine learning system with data comparing, comprising:

a storage having means for storing a multiple of instructional data comprising associated propositions and anticipated responses, data transducing means for reproducing said data from said storage, an input device for generating responses, a character register coupled to said input device for receiving at least a character of each generated response, a comparator coupled to said register and to said storage data reproducing means for comparing that character of the response generated and the corresponding character of all of said anticipated responses, control circuitry including clock pulse regenerating means coupled to said data reproducing means for synchronizing and controlling the system, a temporary store coupled to said comparator, a circulating store coupled to said temporary store and arranged for storing all of the results of all of the successive comparisons, a circulating store clock pulse generator for cycling said circulating store, circuitry coupled to said stores for maintaining a predetermined result of each of said results of all of said comparisons in said circulating store thereafter once that result appears at said circulating store, a result detector coupled to said circulating store and responsive to the first match comparison result ultimately stored therein for determining propositions located in said storage associated with said given response, an output device for presenting a proposition located in said storage, and circuitry for transmitting the last said proposition to said output device.

23. An information translating system with data comparing, comprising:

a storage having means for storing a multiple of data comprising associated wordage and anticipated working in predetermined keyword mode sequence, an initializing mode register coupled to said storage, and an output device for presenting wordage located in said storage, an input device for generating given wording, a register coupled to said input device for receiving at least a portion of said given wording, a comparator coupled to said register and to said storage for comparing the portion of the given wording generated and at least a portion of said anticipated wording, control circuitry for synchronizing and controlling the system a temporary store coupled to said comparator, mode logical circuitry enabled by said mode register interposed between said comparator and said temporary store for storing of results of successive comparisons only in accordance with said predetermined sequence, a circulating store coupled to said temporary store for storing the results of all of the successive comparisons, circuitry coupled to said stores for maintaining a predetermined result in said circulating store thereafter for each result of a comparison of the successive characters of said given wording and the corresponding characters of all of said anticipated wording once that predetermined result obtains, a result detector coupled to said circulating store and responsive to the first result of a match of said given and anticipated wording for determining wordage located in said storage associated with said given wording, a counter in said control circuitry for addressing said storage and said circulating store, and circuitry responsive to said result detector for transmitting the wordage associated with said given wording to said output device.

24. An information translating data comparing system comprising:

a single-character register in which data to be compared is entered character-by-character, a comparator having one input connected to said register, another input and an output, a multiple-character data source having data arranged in rows with the characters of said rows of data aligned in columns and said data source being connected to the other input of said comparator in an arrangement entering the characters of said data into said comparator column-after-column, a temporary result store coupled to said output of said comparator and having output terminals, a circulating store coupled to said output terminals of said temporary result store for storing the results of each comparison, and updating circuitry interposed between said temporary result store and said circulating store for maintaining predetermined results row-after-row in said circulating store once those predetermined results exist, regardless of any subsequent results of the comparisons in said comparator.

References Cited

UNITED STATES PATENTS

| | | | |
|---|---|---|---|
| 3,167,740 | 1/1965 | King et al. | 340—146.2 |
| 3,221,308 | 11/1965 | Petersen | 340—172.5 |
| 2,955,280 | 10/1960 | Hughes | 340—172.5 |
| 3,334,331 | 8/1967 | Bartlett | 340—146.2 |

ROBERT C. BAILEY, Primary Examiner

R. F. CHAPURAN, Assistant Examiner

U.S. Cl. X.R.

340—146.2